No. 672,784. Patented Apr. 23, 1901.
J. F. KRAMER & J. H. BLUM.
COMPENSATING GEARING.
(Application filed Jan. 23, 1901.)
(No Model.)

WITNESSES:

INVENTORS
Joseph F. Kramer
John H. Blum
BY
ATTORNEYS

THE NORRIS PETERS CO., PHOTO-LITHO., WASHINGTON, D. C.

UNITED STATES PATENT OFFICE.

JOSEPH FRANCES KRAMER AND JOHN HJALMAR BLUM, OF GUNDERSON, MONTANA.

COMPENSATING GEARING.

SPECIFICATION forming part of Letters Patent No. 672,784, dated April 23, 1901.

Application filed January 23, 1901. Serial No. 44,440. (No model.)

*To all whom it may concern:*

Be it known that we, JOSEPH FRANCES KRAMER and JOHN HJALMAR BLUM, citizens of the United States, and residents of Gunderson, in the county of Silverbow and State of Montana, have invented new and useful Improvements in Compensating Gearing, of which the following is a full, clear, and exact description.

This invention relates to improvements in compensating gearing particularly adapted for wheeled vehicles, the object being to provide simple gearing to permit of the rotation of the two opposite traction-wheels at different rates of speed while turning corners or moving on a curve.

We will describe compensating gearing embodying our invention and then point out the novel features in the appended claims.

Reference is to be had to the accompanying drawings, forming part of this specification, in which similar characters of reference indicate corresponding parts in all the figures.

Figure 1:
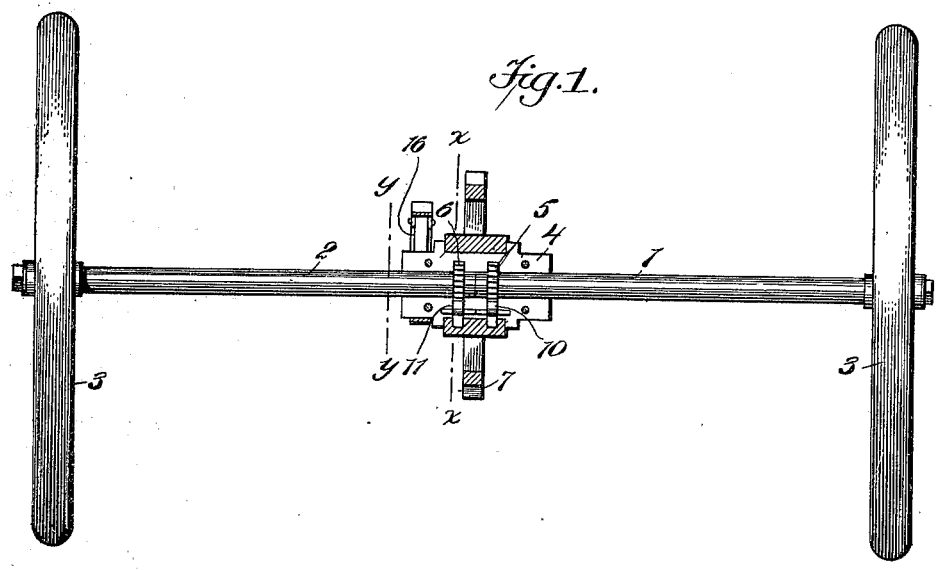
Figure 2:
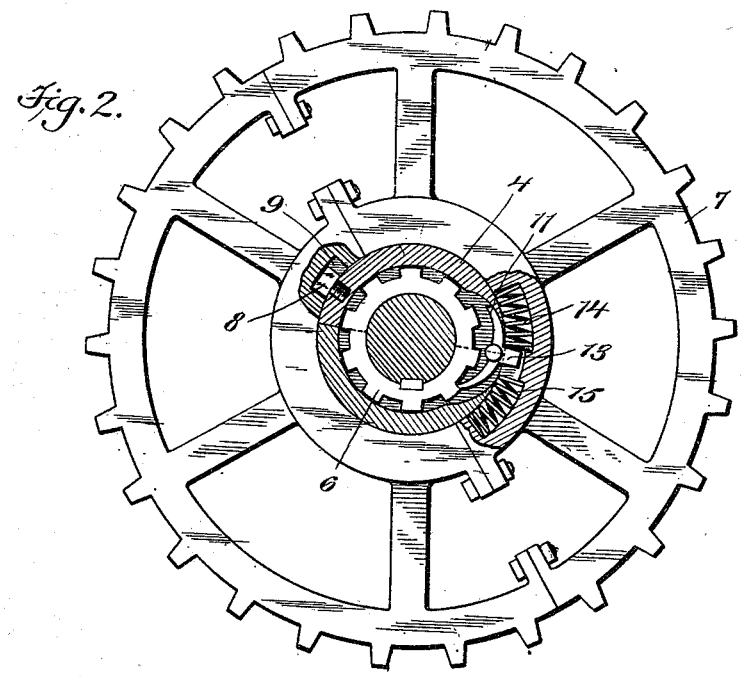
Figure 3:
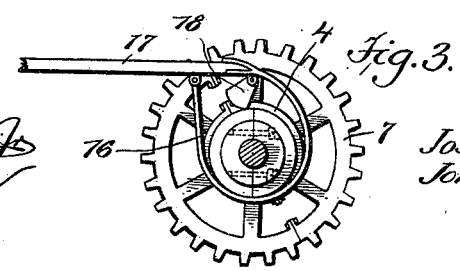

Figure 1 is a sectional elevation of gearing embodying our invention. Fig. 2 is a section on the line $x\,x$ of Fig. 1, and Fig. 3 is a section on the line $y\,y$ of Fig. 1.

The driving-shaft or axle consists of two sections 1 2, and on each section a traction-wheel 3 is rigidly mounted. The ends of the two shaft-sections extend into a sleeve 4, which for convenience is made in two sections bolted together. On the shaft-section 1, within the sleeve 4, is a ratchet-wheel 5, and on the section 2, within said sleeve, is a ratchet-wheel 6, the sleeve being suitably recessed to receive said ratchet-wheels. Mounted on the sleeve and having a slight rotary motion relatively thereto is a sprocket-wheel 7, from which a chain is designed to extend to a motor. A limited movement of the sprocket-wheel circumferentially of the sleeve is permitted by a lug 8, extended from the sleeve into a recess 9, formed in the hub of the sprocket-wheel. It will be noted that the sprocket-wheel is also made in two sections bolted together.

Arranged in the sleeve are pawls 10 and 11, coacting respectively with the ratchet-wheels 5 and 6. These pawls are pivoted and each consists of oppositely-extended fingers for engaging with the teeth of the ratchet-wheels. Extended outward from the pivotal point of each pawl and into a recess formed in the hub of the sprocket-wheel is a finger 13, designed to be engaged on one side with a spring 14 and on the opposite side by a spring 15, these springs being placed in recesses formed in the hub of said sprocket-wheel. A brake-band 16, of spring metal, passes around one end of the sleeve 4 and has its ends connected to a fixed portion 17 of the vehicle, and attached to this band, so as to swing relatively thereto, is an eccentric clutch 18.

In operation, upon turning a corner or curve and assuming the wheel of the shaft-section 1 to be at the inner side, and consequently moving at a less speed than the other wheel, the motion imparted to the sprocket-wheel will cause the pawl engaging with the ratchet 5 to hold the shaft in rigid connection with the sleeve, so that said shaft moves at the same rate of speed as the sleeve and the sprocket-wheel, while the pawl coacting with the ratchet-wheel 6 will slide over the teeth thereof during the slow rotary movement of the wheel on the shaft 1. In backing or reversing the motion imparted to the sprocket-wheel will turn the sleeve until the clutch 18, riding upon the top of said sleeve, will draw the band 16 into tight engagement with the sleeve, holding it still, and during this sliding movement the sprocket-wheel will be turned to bring the finger 13 into engagement with the forward spring 15, when the clutch 18 will drop to the opposite side, releasing the brake-band 16. When the vehicle is moving in a straight line, both wheels 3 will be positively driven.

It will be noted that the working parts are inclosed and protected from dust.

Having thus described our invention, we claim as new and desire to secure by Letters Patent—

1. In a vehicle, a shaft consisting of two sections, ratchet-wheels on adjacent ends of the shaft-sections, a sleeve surrounding said ends of the shaft-sections and in which said ratchet-wheels are arranged, double-arm pawls coacting with the ratchet-wheels, springs coacting with the pawls, and a driving-wheel mounted on the sleeve, substantially as specified.

2. The combination with a driving-shaft, consisting of two sections, of compensating gearing, comprising ratchet-wheels mounted on the adjacent ends of the two shaft-sections, a sleeve surrounding said ends of the shaft-sections, double-arm pawls mounted to swing in said sleeve and coacting with the ratchet-wheels, a sprocket-wheel having a slight rotary motion on said sleeve, springs arranged in recesses formed in the hub of said sprocket-wheel and adapted for engagement with fingers extended from the pawls, and a brake-strap for automatically acting on the sleeve, substantially as specified.

3. In a vehicle, opposite driving-wheels, shaft-sections on which said wheels are mounted, a sleeve into which the adjacent ends of said shaft-sections extend, ratchet-wheels on the ends of the shaft-sections within the sleeve, pawls carried by the sleeve and coacting with the ratchet-wheels, and a driving-wheel having movement on the sleeve for reversing the pawls, substantially as specified.

In testimony whereof we have signed our names to this specification in the presence of two subscribing witnesses.

JOSEPH FRANCES KRAMER.
JOHN HJALMAR BLUM.

Witnesses:
FRED. COBB,
HARRY NORTH.